United States Patent
McPheeters

(10) Patent No.: US 9,341,201 B2
(45) Date of Patent: May 17, 2016

(54) SELF-ADJUSTING END CLAMP

(71) Applicant: Mainstream Energy Corporation, San Luis Obispo, CA (US)

(72) Inventor: Greg McPheeters, Santa Clara, CA (US)

(73) Assignee: Sunrun South LLC, San Luis Obispo, CA (US)

(*) Notice: Subject to any disclaimer, the term of this patent is extended or adjusted under 35 U.S.C. 154(b) by 65 days.

(21) Appl. No.: 13/633,061

(22) Filed: Oct. 1, 2012

(65) Prior Publication Data

US 2013/0111713 A1    May 9, 2013

Related U.S. Application Data

(60) Provisional application No. 61/541,985, filed on Sep. 30, 2011, provisional application No. 61/586,648, filed on Jan. 13, 2012.

(51) Int. Cl.

| | | |
|---|---|---|
| F16B 2/06 | (2006.01) | |
| F16B 2/12 | (2006.01) | |
| H01L 31/042 | (2014.01) | |
| H02S 20/24 | (2014.01) | |
| F24J 2/46 | (2006.01) | |
| F24J 2/52 | (2006.01) | |

(52) U.S. Cl.
CPC . *F16B 2/065* (2013.01); *F16B 2/12* (2013.01); *H02S 20/00* (2013.01); *H02S 20/24* (2014.12); *F24J 2/4638* (2013.01); *F24J 2/5203* (2013.01); *Y02E 10/50* (2013.01); *Y10T 24/44974* (2015.01)

(58) Field of Classification Search
CPC ......... B25B 5/102; B25B 1/103; F16B 2/065; H02S 20/24; H02S 20/00; F24J 2/4638; F24J 2/5203; Y10T 24/44974
USPC ............ 24/569, 525, 514; 248/316.6, 229.12, 248/228.3
See application file for complete search history.

(56) References Cited

U.S. PATENT DOCUMENTS

| | | | | |
|---|---|---|---|---|
| 1,473,504 A | * | 11/1923 | Neely | 191/40 |
| 1,523,597 A | * | 1/1925 | Lang | 248/228.3 |
| 1,649,619 A | * | 11/1927 | Slevin | 248/690 |
| 6,032,939 A | * | 3/2000 | Chen | 269/249 |
| 8,505,863 B2 | * | 8/2013 | McPheeters | 248/228.2 |

* cited by examiner

*Primary Examiner* — Robert J Sandy
*Assistant Examiner* — Michael Lee
(74) *Attorney, Agent, or Firm* — Kramer Levin Naftalis & Frankel LLP

(57) ABSTRACT

Self-adjusting end clamps are disclosed. The clamps may include a top member and a bottom member having vertically arranged holes. As a bolt placed in the vertically arranged holes is tightened, the top and bottom members move toward one another to grip an object therebetween.

18 Claims, 13 Drawing Sheets

SELF-ADJUSTING END CLAMP

CROSS-REFERENCE TO RELATED APPLICATIONS

This application claims the benefit of U.S. Provisional Application No. 61/541,985, filed Sep. 30, 2011 and U.S. Provisional Application No. 61/586,648, filed Feb. 13, 2012, both of which are incorporated by reference herein in their entirety.

BACKGROUND

Solar cell panels (also referred to as solar cell modules) are an increasingly popular means of generating renewable power, and recently there has been a wide proliferation of solar projects of all sizes, from small residential installations to large utility scale power production. Current solar cell panels are typically composed of photovoltaic solar cells encased in a rigid supporting frame. When installed, these solar cell panels are supported by a racking system, which together comprise a solar panel installation.

A problem with many current methods of installing solar panels is that the surface supporting the solar panel installation must be penetrated to attach the system. For example, typical solar panel installations are secured to rooftop surfaces by penetrating the roof surface with screws or other means. Adequately securing the solar panel system to the surface is critical to protect the panels and surrounding property from damage caused by wind and/or seismic activity, both of which could cause damage if the solar panel system is not properly secured to the surface. Moreover, securing solar panel systems to a surface often requires that the surface be penetrated numerous times, thereby compromising the surface's integrity. This is particularly problematic on rooftop installations where the roof surface is sealed to protect against moisture entering the building.

SUMMARY

Various embodiments described herein overcome drawbacks associated with conventional techniques and devices for securing and supporting solar panel systems. Accordingly, the disclosed wind tunnel optimized solar panel systems can include a racking system that may be configured to reduce the lift on a solar panel system caused by wind. In some embodiments, this is accomplished through the use of specifically placed windscreens. Reducing the lift caused from wind reduces the force necessary to keep the solar panels in place. The size and placement of the windscreens have been refined through testing to allow pressure equalization in high lift situations as a result of tight fit to the mounting surface and strategic venting. In some embodiments, the windscreens can also include a rack for holding a number of ballast weights that use the force of gravity to keep the solar panel system in place, even in the face of wind and/or seismic activity.

Accordingly, there are provided wind tunnel optimized solar panel racking systems that can support and secure solar panels to a surface while reducing the need for the damaging surface penetrations typically required to securely install solar panels.

BRIEF DESCRIPTION OF THE DRAWINGS

The above and other objects and advantages of the invention will be apparent upon consideration of the following detailed description, taken in conjunction with the accompanying figures, in which like reference characters refer to like parts throughout, and in which.

DETAILED DESCRIPTION

Figure 1:
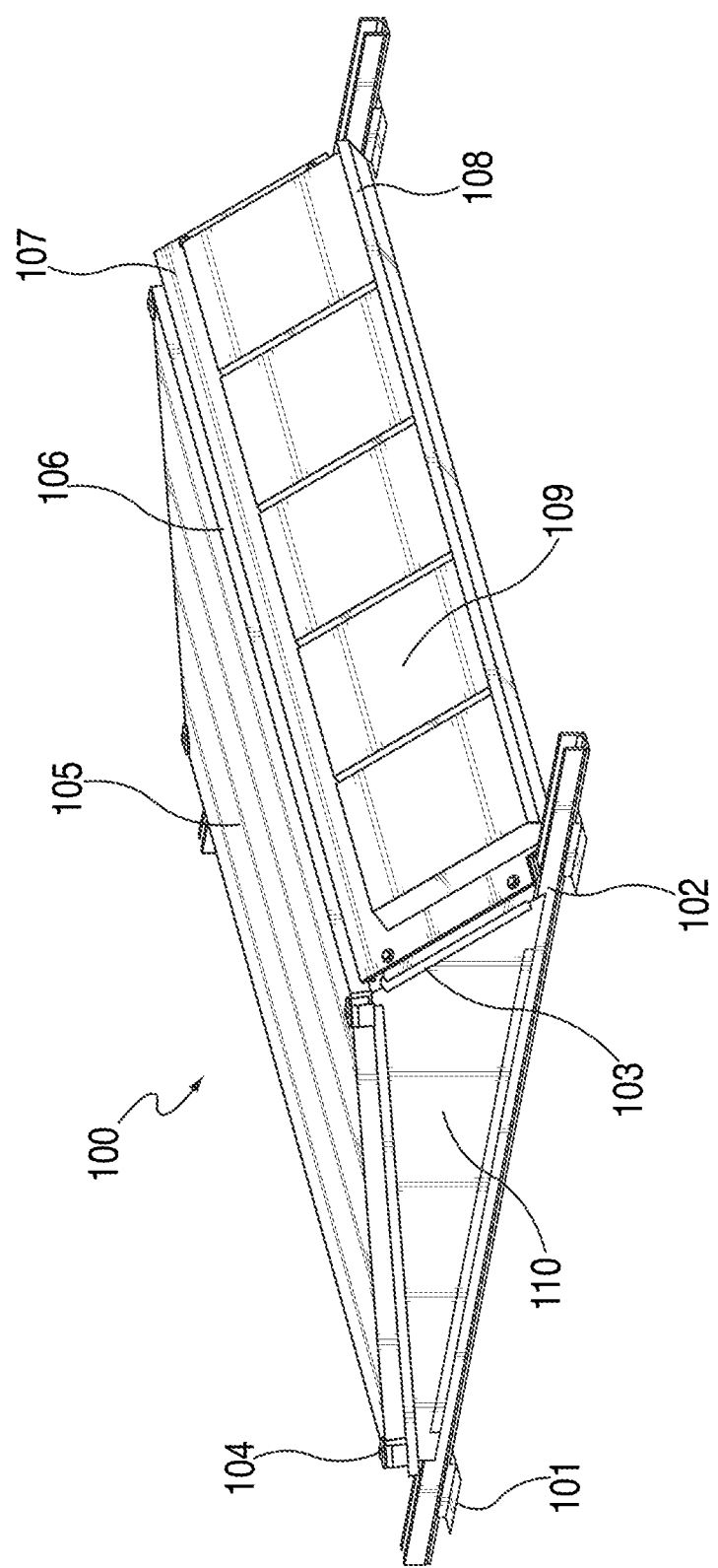
FIG. 1 depicts an exemplary embodiment of a wind optimized and ballasted solar panel system.

Reference will now be made in detail to the embodiments of the present invention, examples of which are illustrated in the accompanying drawings.

Wind tunnel optimized solar panel systems can include solar panel modules mounted to a racking system that includes a number of features designed to reduce uplift caused by environmental factors, such as wind, and increase the amount of downforce on the solar panel system. To this end, a wind tunnel optimized solar panel system can include a number of windscreens, wind grates, and ballast weights, which, together, can achieve those dual objectives. By reducing uplift while increasing downforce, a solar panel system may be installed on a surface without the need for mounting hardware that can penetrate and/or damage the surface.

The weight required to secure a solar panel system may depend on specific environmental circumstances including, for example, location, altitude, typical local weather patterns, and seismic activity. The weight of the ballast weights can be easily varied to meet the environmental conditions by adding or reducing the number or type of ballast weights, as needed. The combination of a wind optimized design and ballast weights allows a solar panel system to reduce the depth and/or number of penetrations required for installation. In some installations, the need for surface penetrations may be eliminated entirely. In some embodiments, standoff attachments can be incorporated into a solar panel system, which can further help to enhance stability of the system in windy conditions and/or in the event of seismic activity.

Besides reducing or eliminating the need to penetrate the surface on which the solar panel system is installed, some embodiments may have the added benefit of simplifying the installation process by reducing the number of steps required to install the solar panel systems. The cost of installation may further be reduced by reducing the tools and equipment an installer is required to bring to the job site.

In some embodiments, modules can be installed in a landscape orientation in which a long side of the solar panel module is parallel to the installation surface (e.g., a roof or the ground). Such an orientation can keep modules close to the installation surface to reduce uplift on the modules caused by the wind. In some embodiments, the solar panel system can be installed on a flat surface with the modules tilted to increase solar exposure. In some further embodiments, the racking system can include shared rails, which can form a more efficient structure that uses less material and assembles more quickly than typical solar panel systems. Tilt legs coupled to flat rails can provide for module tilt and mounting points for windscreens to reduce uplift on the modules.

Windscreen installation may be accomplished by coupling a windscreen to rear tilt legs on the solar panel system. Self-adjusting end clamps can allow for end-of-row windscreen installation without using requiring additional fasteners. Such self-adjusting end clamps can also permit strategic venting at the ends of a row of modules. Windscreens may also include a tray that can hold ballast. In some embodiments, additional windscreens can be installed under the modules to support additional ballast. In some embodiments, windscreens designed to block or redirect wind can also double as structural members for the solar panel system, providing additional system rigidity.

The mounting rails can also double as a structural member, providing system rigidity. In some embodiments, the inherent rigidity in the structure allows for distribution of wind loading over the entire system, which may reduce the amount of ballast weight required, thereby reducing the overall system weight and installation cost.

In some embodiments, standoff attachments may also be incorporated into the system design to provide for seismic or uplift loading as needed to meet local code design and load requirements. As would be appreciated by one skilled in the art, the system can be compatible with a range of module sizes, and may use self-adjusting end clamps to secure modules with a range of module frame thicknesses.

FIG. 1 is an exemplary embodiment of a wind optimized and ballasted solar panel system 100. Solar panel system 100 can include feet 101, rails 102, support legs 103, self-adjusting end clamps 104, a solar panel module 105, wind grates 106, a wind screen 107, a ballast support tray 108, ballast weights 109, and side windscreens 110. FIG. 1 depicts a single panel system. However, in some embodiments, rails 102 can extend beyond the lengths shown in FIG. 1, facilitating the installation of multi-panel systems. Such systems are described in greater detail below with respect to FIGS. 11 and 12.

Feet 101 can each include a flat portion that rests on a surface and a vertical portion extending perpendicularly or obliquely from the flat portion that can connect to a rail 102. Feet 101 may be designed to snap into the rails 102. Alternatively, feet 101 can be connected to rails 102 with screws, bolts, or other suitable fasteners. Feet 101 can be constructed of any suitable material (e.g., a metal, such as steel or aluminum, a plastic, or a composite). In some embodiments, the surface area of the flat portion of feet 101 can be determined based on, for example, the characteristics of the surface on which they will rest.

As depicted in FIG. 1, solar panel system 100 can include four feet 101 (one foot is not visible), with one foot at each corner of solar panel system 100. However, one skilled in the art will appreciate that any suitable number of feet can be included depending on, for example the circumstances (e.g., environmental considerations such as wind and seismic activity) and the composition of the mounting surface. Feet 101 can also serve to lift rails 102 slightly off the mounting surface, which can facilitate drainage of the area underneath solar panel system 100, for example. In other embodiments, additional feet 101 can be included depending on the circumstances and the composition of the mounting surface. Solar panel systems, according to some embodiments, can be mounted on a number of different relatively level surfaces such as, for example, a roof or the ground.

Rails 102 can be mounted on feet 101 to form a base for solar panel system 100. Accordingly, two rails 102 may be placed parallel to one another at a width corresponding, roughly, to the width of solar panel module 105. Furthermore, rails 102 can have any suitable length. For example, rails 102 can be long enough to provide a stable base for a single solar panel system 100. In other embodiments, rails 102 can be long enough to support two or more solar panel systems as discussed in more detail below with respect to FIG. 9. Rails 102 may be constructed of any suitable material (e.g., for example aluminum, steel, plastic or composite). In some embodiments, feet 101 can be configured to snap into notched surfaces formed in rails 102.

Support legs 103 may be used to support the solar panel modules at an angle determined appropriate for the location. For example, the angle may be chosen to optimize solar exposure at the installation location's latitude. In particular, the length of the support legs 103 and the angle at which they are attached to rails 102 may be varied depending on the desired angle of solar panel module 105. Support legs 103 may be constructed of any suitable material (e.g., aluminum, steel, plastic or composite).

In some embodiments, support legs 103 can be secured using either two split lock washers or two internal star washers. Star washers may be especially appropriate as they can provide electrical continuity for grounding solar panel system 100. However, as would be appreciated by a person of skill in the art, any suitable fasteners may be used to couple support legs 103 to rails 102. Support legs 103 may also have two holes at the top to allow the inclusion of a WEEB grounding washer or the equivalent.

Self-adjusting end clamps 104 can be two-piece end clamps used to secure solar panel module 105 to the rest of solar panel system 100. Self-adjusting end clamps 104 may be secured in place with a bolt that causes the self-adjusting end clamps 104 to automatically adjust to the size of the frame of solar panel module 105. Although solar panel system 100 includes four self-adjusting end clamps 104 in this example embodiment, more self-adjusting end clamps may be required depending on the environmental conditions where solar panel system 100 is installed. Furthermore, mid clamps may be used to connect multiple solar panel modules arranged in a row.

In the exemplary embodiment shown in FIG. 1, solar panel module 105 may be a photovoltaic solar panel that includes an array of photovoltaic cells.

Wind grates 106 can be incorporated between the top edges of solar panel module 105 and windscreen 107 to permit airflow and pressure equalization of solar panel system 100. Wind grates 106 can include openings of any suitable shape (e.g., a rectangular shape). In some embodiments, wind grates 106 can be formed from one contiguous piece with separate openings cut into the piece. In these embodiments, wind grates 106 may be of nesting roll-form steel construction that is cheap to manufacture and easy to ship. Roll-form steel has the additional benefits of being strong and easy to work with. Holes on the top of wind grates 106 can be punched, stamped, or otherwise formed to provide ventilation of solar panel system 100. Such ventilation can serve to keep solar panel module 105 cool and provide pressure equalization to mitigate uplift from wind forces. Wind grates 106 may be constructed of any suitable material (e.g., aluminum, steel, plastic or composite).

Windscreen 107 can be coupled to the back of solar panel system 100 to block airflow and at least partially support ballast weights 109. Windscreen 107 may be constructed of any suitable material (e.g., aluminum, steel, plastic or composite). Windscreen 107 may be attached to support legs 103 with, for example, bolts or screws. In other embodiments, windscreen 107 may be snapped into place on the support legs 103.

Ballast support tray 108 can be attached to windscreen 107 to support ballast weights 109. Accordingly, ballast support tray 108 can extend perpendicularly or obliquely from the outer surface of windscreen 107 to form a ledge. Ballast weights 109 can be placed on the ledge of ballast support tray 108 to provide downforce to solar panel system 100, which can serve to counter uplift generated by, for example, wind. Ballast support tray 108 may be constructed of any suitable material (e.g., aluminum, steel, plastic or composite). In some embodiments, ballast support tray 108 and windscreen 107 can be formed as a single, contiguous piece. In other embodiments, ballast support tray 108 can be attached to windscreen 107 with bolts, screws and/or other suitable fasteners.

Ballast weights 109 may be concrete blocks or any other suitable weighted objects used to hold the solar panel system 100 in place and counteract dangerous uplift forces. The number of ballast weights 109 used and their weights may depend on the environmental requirements of the solar panel system 100.

In some embodiments, wind grates 106, windscreen 107 and ballast support tray 108 can be a single contiguous piece of roll form steel. For example, a long strip of sheet metal can be exposed to a roll-forming process that can create a first section for wind grates 106, a second section for windscreen 107, and at least a third section for ballast support tray 108. Openings in wind grates 106 can be formed either before or after the roll-forming process. One skilled in the art will appreciate that some portions (e.g., windscreen 107 and ballast support tray 108) can be formed together, and other portions (e.g., wind grates 106) can formed and coupled to solar panel system 100 separately.

Side windscreens 110 can be coupled to one or both sides of solar panel system 100 (e.g., to rails 102, support legs 103, and/or solar panel module 105) to divert airflow around solar panel system 100. Side windscreens 110 may be constructed of any suitable material (e.g., aluminum, steel, plastic or composite).

Figure 2:
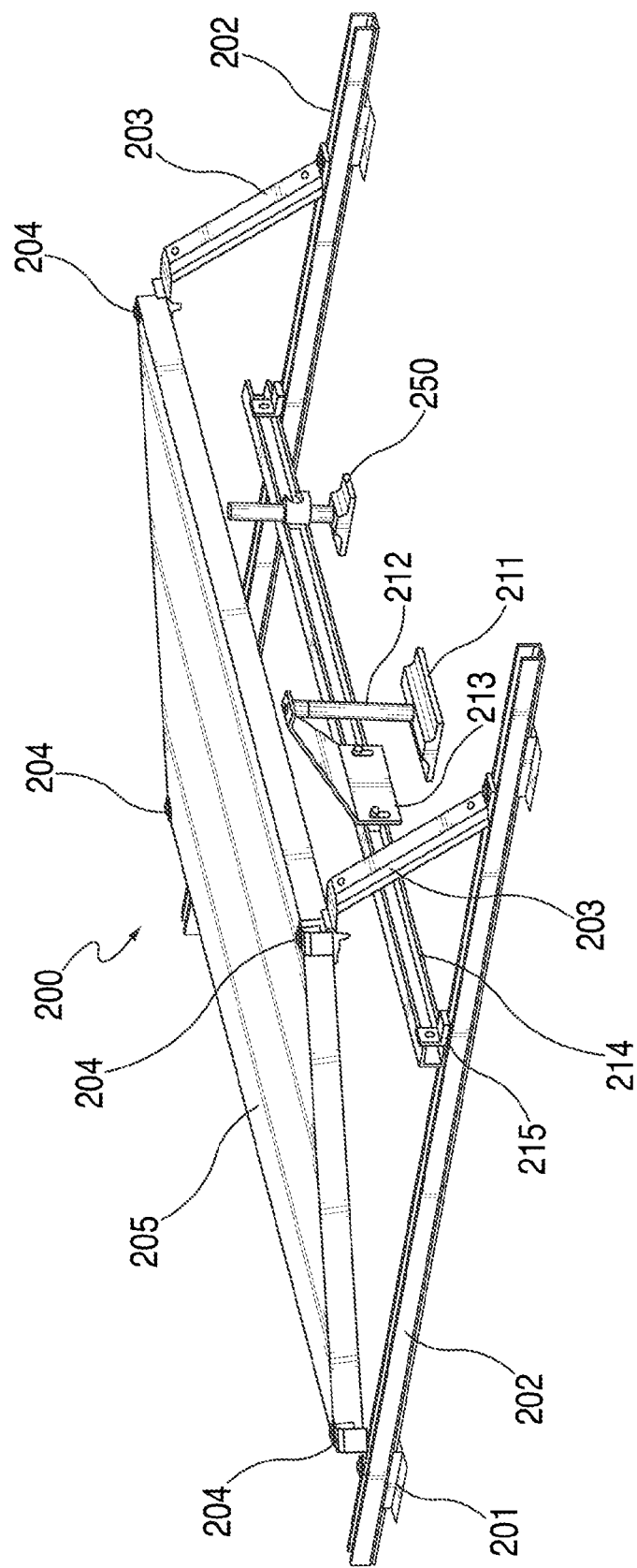
FIG. 2 depicts a view of a partially assemble exemplary embodiment of a solar panel system with a mechanical anchor.

FIG. 2 depicts an example embodiment of a partially constructed solar panel system 200. Solar panel system 200 can include feet 201, rails 202, support legs 203, self-adjusting end clamps 204, solar panel module 205, mechanical anchor 211, standoff attachment 212, standoff bracket 213, anchor rail 214 and mechanical anchor 250. In some embodiments, partially constructed solar panel system 200 depicts a subassembly for constructing a complete solar panel system as depicted in FIG. 1.

Solar panel system 200 can be installed on a relatively flat surface (e.g., a roof or the ground) to provide a stable base for a full solar panel system. In particular, rails 202 can be mounted on feet 201 such that the rails are parallel to each other at a width roughly corresponding to the width of a solar panel module (e.g., solar panel module 105 of FIG. 1) to be mounted to the solar panel system. Rails 202 can be mounted on feet 201 in any suitable manner. For example, rails 202 can include notched surfaces configured to snap onto corresponding features of feet 201. In other embodiments, rails 202 can be mounted to feet 201 using any suitable hardware (e.g., bolts, screws, and or other fasteners).

Support legs 203 can be coupled to rails 202 to support the solar panel module. In particular, support legs 203 can be mounted on rails 202 at an angle optimized for the location of the solar panel installation. For example, the angle may be chosen to optimize the angle of a solar panel module to receive maximum sun exposure at a particular latitude. In these and other embodiments, the angle may further be chosen to reduce the effect of uplift caused by wind at the installation site. A windscreen (e.g., windscreen 107 of FIG. 1) can also be mounted to solar panel system 200 at an angle determined by support legs 203. Support legs 203 can be coupled to rails 202 in any suitable manner. For example, support legs 203 may be configured to snap into rails 202 and/or attach to rails 202 using one or more fasteners.

According to some embodiments, mechanical anchor 211, standoff attachment 212, standoff bracket 213 and anchor rail 214 can serve to secure solar panel system 200 to a surface. Mechanical anchor 211 may be required depending on local regulations and/or conditions at the installation site. Mechanical anchor 211 can used, for example, if tall flashings (e.g., 8" flashings) are required for the installation surface (e.g., for waterproofing purposes). In particular, to make room for tall flashings, mechanical anchor 211 can be coupled to anchor rail 214 with standoff bracket 213 and a standoff attachment 212. Standoff bracket 213 can include a riser section coupled to anchor rail 214 with one or more fasteners, a spacer section, which can extend obliquely (e.g., at a 45° angle) in a direction away from both anchor rail 214 and the installation surface, and a standoff section for coupling to standoff attachment 212. Standoff attachment 212 may be configured to position mechanical anchor 211 properly with respect to the tall flashing.

In embodiments in which a tall flashing is not required, a simpler mechanical anchor 250 can be used to secure solar panel system 200 to the installation surface. In particular, mechanical anchor 250 can simply be coupled to anchor rail 214 with a single bracket, obviating the need for standoff bracket 213. Mechanical anchor 250 may be appropriate, for example, if a shorter flashing such as, for example, a pour in place curb flashing is used.

Anchor rail 214 can be configured to perpendicularly span and couple to rails 202 to provide a mounting point for standoff bracket 213, standoff attachment 212, and mechanical anchor 211. In some embodiments, anchor rail 214 can be coupled to a rail 202 with an L-foot 215. L-foot 215 can have a first portion that attaches to anchor rail 214 and a second portion that attaches to rail 202, thus coupling anchor rail 214 to rail 202. In some embodiments, L-foot 215 can be coupled to channel nuts snapped into anchor rail 214 and or rail 202 with a bolt. Aside from providing a mounting surface for mechanical anchor 211 and/or mechanical anchor 250, anchor rail 214 may provide additional structural support for solar panel system 200.

Figure 3:
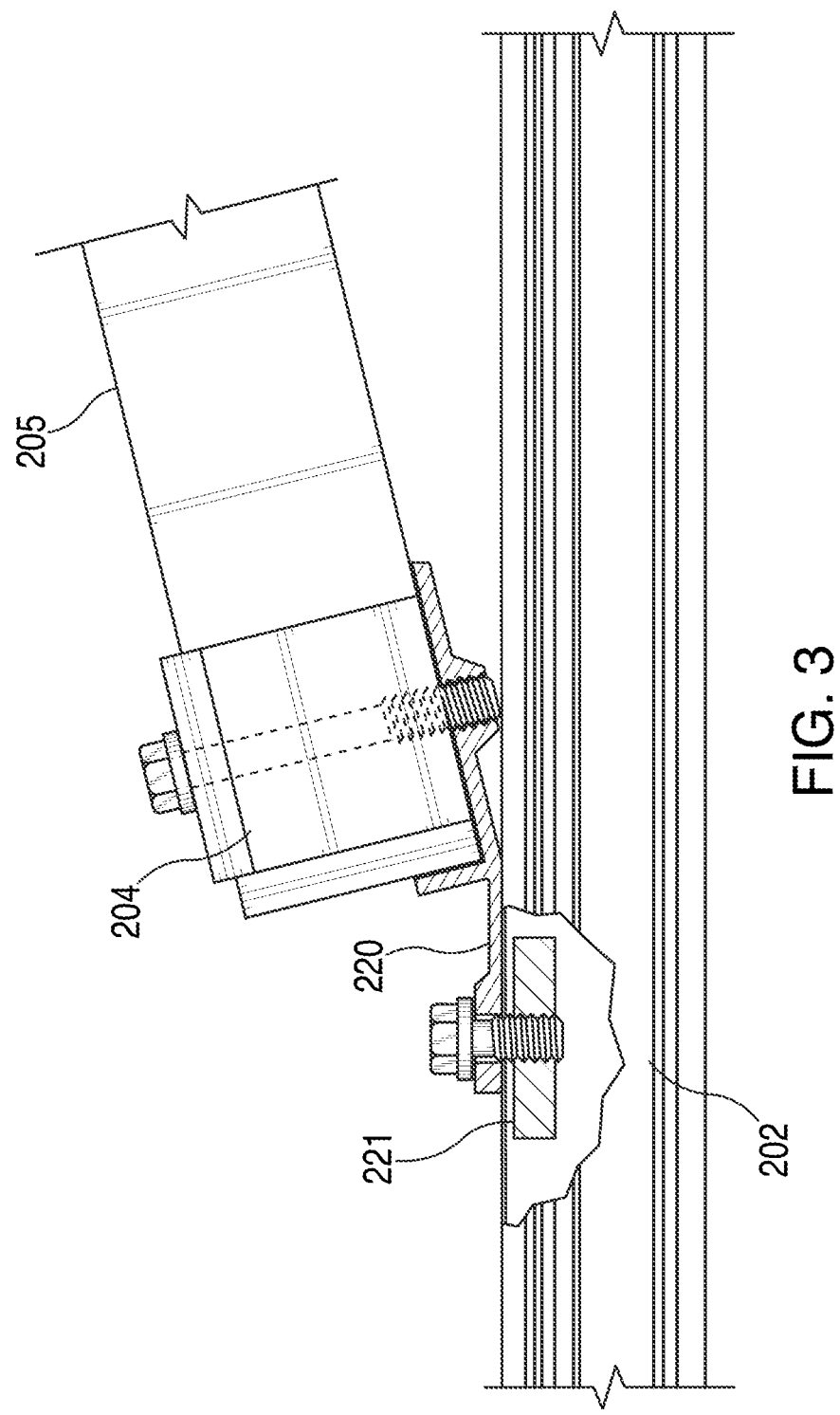
FIG. 3 depicts a detailed cross-section of a solar panel module attached to a rail.

FIG. 3 depicts a detailed cross-sectional view of a portion of solar panel system 200 of FIG. 2, including solar panel module 205 coupled to rail 202 with a split leg 220, a channel nut 221, and self-adjusting end clamp 204. Split leg 220 may be a rigid member that is configured to tilt solar panel module 205 at a predetermined angle. In some embodiments, the angle of the short tilt leg used to attach the rail to the module can be varied depending on the desired angle of the module. Accordingly, split leg 220 can include a first section configured to lie flush against the top of rail 202, a second section bent at the predetermined angle from the first section that is configured to lie flat against the bottom surface of solar panel module 205, and a vertical section extending from the junction between the first section and the second section that is configured to support the bottom side surface of solar panel module 205.

Split leg 220 can be coupled to rail 202 using any suitable fasteners. However, according to some embodiments, a channel nut 221 can be coupled to a channel of rail 202 (e.g., by snapping channel nut into notches formed in rail 202), and a bolt can be threaded hole in split leg 220 and into a threaded hole of channel nut 221. Furthermore, solar panel module 205 can be coupled to split leg 220 with a clamp. For example, if clamp 204 is at an outer edge of a row of solar panel systems, clamp 204 can be a self-adjusting edge clamp. On the other hand, if clamp 204 is positioned between two solar panel systems in the same row, clamp 204 can be a mid clamp.

Figure 4:
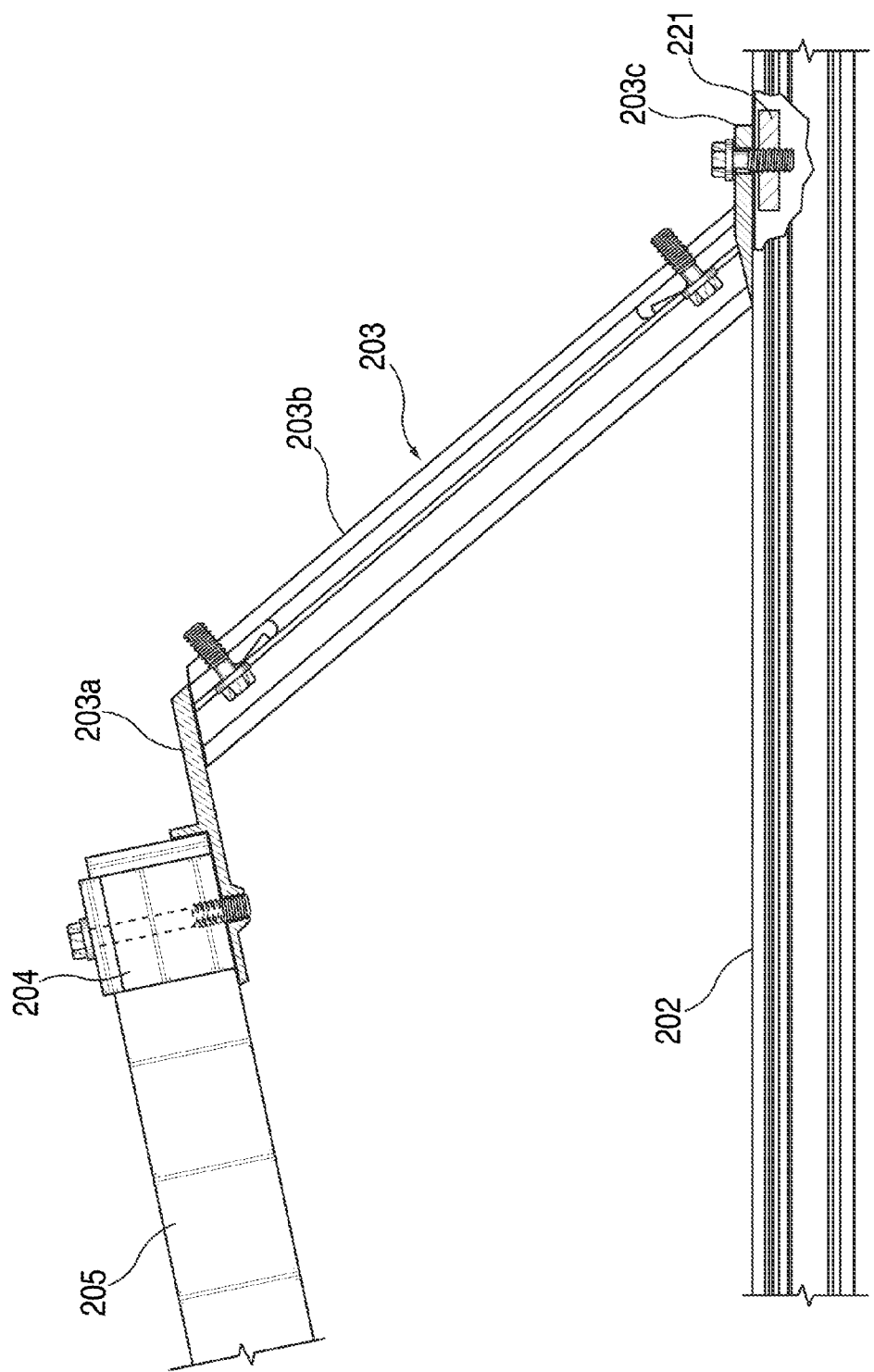
FIG. 4 depicts a detailed cross-section of a solar panel module attached to a support leg.

FIG. 4 depicts a detailed cross-sectional view of solar panel system 200 of FIG. 2, including solar panel module 205 attached to support leg 203. In some embodiments, support leg 203 can be formed from a top section 203a, a rail section 203b, and a base section 203c. In such embodiments, solar panel module 205 can be attached to top section 203a of support leg 203 with clamp 204 (e.g., a self-adjusting end clamp or a mid clamp), and top section 203a can be attached to a rail section 203b of support leg 203 with a fastener (e.g., a bolt and washer). Support leg 203 can be attached to rail 202 via a base section 203c, which can, in turn, be attached to rail section 203b with a fastener (e.g., a bolt and washer). Additionally, base section 203c can be attached to rail 202 with suitable hardware, such as a bolt with a split lock washer threaded into channel nut 221, which can be identical to channel nut 221 of FIG. 3. According to other embodiments, support leg 203 could be molded, stamped, or otherwise formed as a single, contiguous piece.

Figure 5:
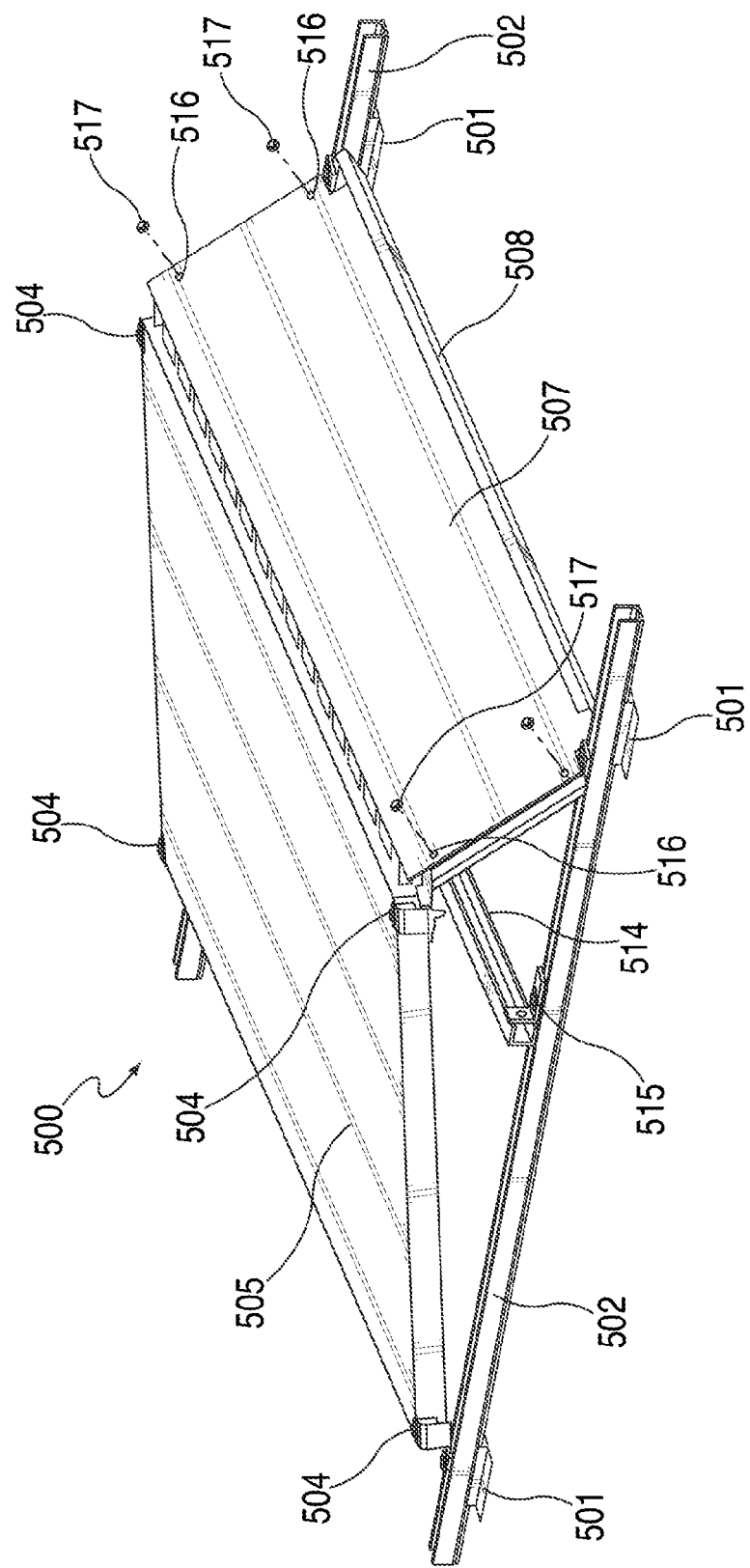
FIG. 5 depicts a view of a partially assemble exemplary embodiment of a solar panel system.

FIG. 5 depicts an example embodiment of a partially constructed solar panel system 500. Solar panel system 500 can include feet 501, rails 502, support legs 503, self-adjusting end clamps 504, solar panel module 505, wind grates 506, windscreen 507, ballast support tray 508, and anchor rail 514. Solar panel system 500 can be, for example, a subassembly of solar panel system 100 of FIG. 1.

In some embodiments, windscreen 507, wind grates 506, and ballast support tray 508 can be formed together as one contiguous piece. For instance, the three sections can be formed from the three portions of a "ZEE" shaped roll form. The top portion of the ZEE-shaped roll form can form the section for wind grates 506. Wind grates 506 can include openings to allow ventilation for solar panel system 500 and passive cooling of solar panel module 505. The openings formed to create wind grates 506 can be any suitable shape and size to promote optimal cooling and ventilation while retaining sufficient structural integrity.

The main portion of the ZEE-shaped roll form can form the section for windscreen 507. Windscreen 507 can be configured to block or redirect wind around solar panel system 500 to prevent dangerous uplift forces. Windscreen 507 can also include slotted mounting holes 516 to facilitate usage with solar panel modules of varying sizes. Windscreen 507 may be coupled to support legs 503 with any suitable fastener (e.g., flange nuts).

Figure 6:
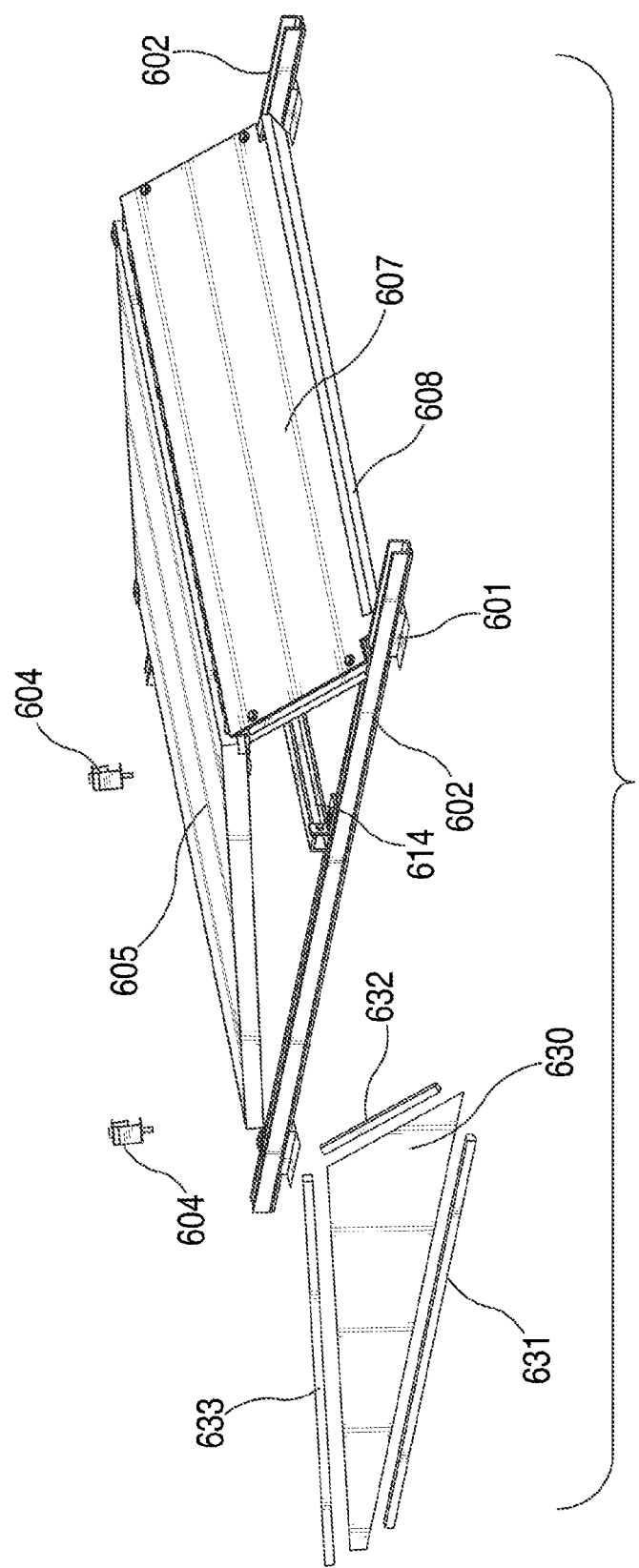
FIG. 6 depicts an exploded view of a partially assemble exemplary embodiment of a solar panel system.

FIG. 6 depicts a partially constructed solar panel system 600 including an exploded view of a side windscreen 630 and trim pieces 631, 632, and 633. Solar panel system can include feet 601, rails 602, support legs 603, self-adjusting end clamps 604, solar panel module 605, wind grates 606, rear windscreen 607, ballast support tray 608 and side windscreens 610. Solar panel system 600 can be, for example, a subassembly of solar panel system 100 of FIG. 1.

Side windscreen 630 can be coupled to the rest of solar panel system 600 with trim pieces 631, 632, and 633. Trim piece 631 can include a hook configured to snap onto, or otherwise securely couple to, rail 602. In some embodiments, the hook can include a flange that engages a notch in a rail 602. In other embodiments, the hook fits closely against a flange of rail 602. Trim piece. Similarly, trim piece 632 can snap onto, or otherwise securely engage, a support leg 603. Trim piece 633, on the other hand, may be secured to solar panel module 605 with self-adjusting end clamps as discussed in more detail below. Trim pieces 631, 632, and 633 can each include a slot configured to receive and securely retain an edge of side windscreen 630.

Side windscreen 630 may be cheaply and easily manufactured from a flat piece of sheet metal or similar material. In some embodiments, side windscreen 630 can be shaped so as to leave a gap between itself and solar panel module 605 to vent solar panel system 600 and passively cool solar panel module 605. Furthermore, side windscreen 630 can help direct wind around solar panel system 600 to prevent dangerous uplift on solar panel module 605.

According to embodiments in which only a single solar panel system is included in the installation, side windscreens 630 can be mounted on each side of solar panel system 600. However, if solar panel system 600 is part of a row of individual solar panel systems, side windscreen 630 may only be mounted on one side (i.e., the side of solar panel system 600 not directly connected to an adjacent solar panel system in the row).

Figure 7:
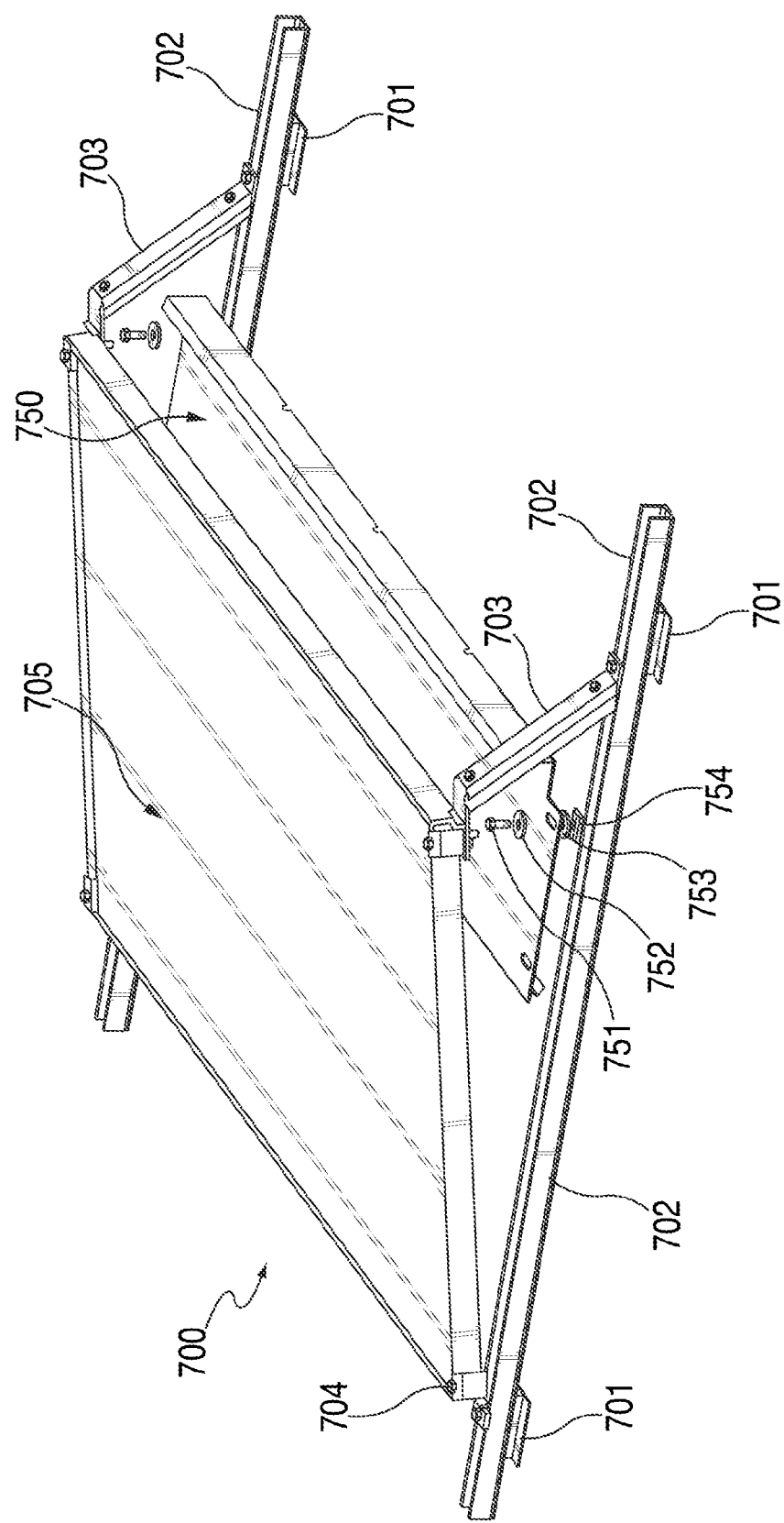
FIG. 7 depicts an example embodiment of a wind optimized and ballasted solar panel system with additional wind screens being installed to provide additional ballast trays under the module.

FIG. 7 is an exemplary embodiment of a wind optimized and ballasted solar panel system 700. The solar panel system 700 includes feet 701, rails 702, support legs 703, self-adjusting end clamps 704, solar panel module 705 and a horizontal ballast support tray 750. FIG. 7 shows a single panel system, but in certain embodiments, rails 702 may continue beyond what is shown in FIG. 7, allowing for multiple panel systems. Solar panel system 700 can be, for example, a subassembly of solar panel system 100 of FIG. 1.

Horizontal ballast support tray 750 can be attached to rails 702 with any suitable hardware. According to some embodiments, horizontal ballast support tray 750 can include a number of slotted mounting holes configured receive a combination of a bolt, washers and a channel nut for coupling horizontal ballast support tray 750 to rails 702. In these embodiments, slotted mounting holes formed in horizontal ballast support tray 750 can receive a bolt 751 configured to thread through a first washer 752, horizontal ballast support tray 750, a second washer 753, and finally into a channel nut 754. Channel nut 754 can be inserted into rail 702 to secure horizontal ballast support tray 750. Further, in some embodiments, horizontal ballast support tray 750 may be formed in one contiguous piece with one or more side or rear windscreens (not shown in FIG. 15). These embodiments can serve to simplify a solar panel system by allowing one part to serve multiple system functions.

Horizontal ballast support tray 750 can support ballast weights, which can aid in securing solar panel system 700 to a surface. In particular, because the weight required to properly secure solar panel system 700 to the installation surface may vary based on the environmental conditions at the installation site, additional ballast may be required beyond what can be mounted on, for example, ballast support tray 108 of FIG. 1. Horizontal ballast support tray 750 may be constructed of any suitable material (e.g., aluminum, steel, plastic or composite).

Figure 8:
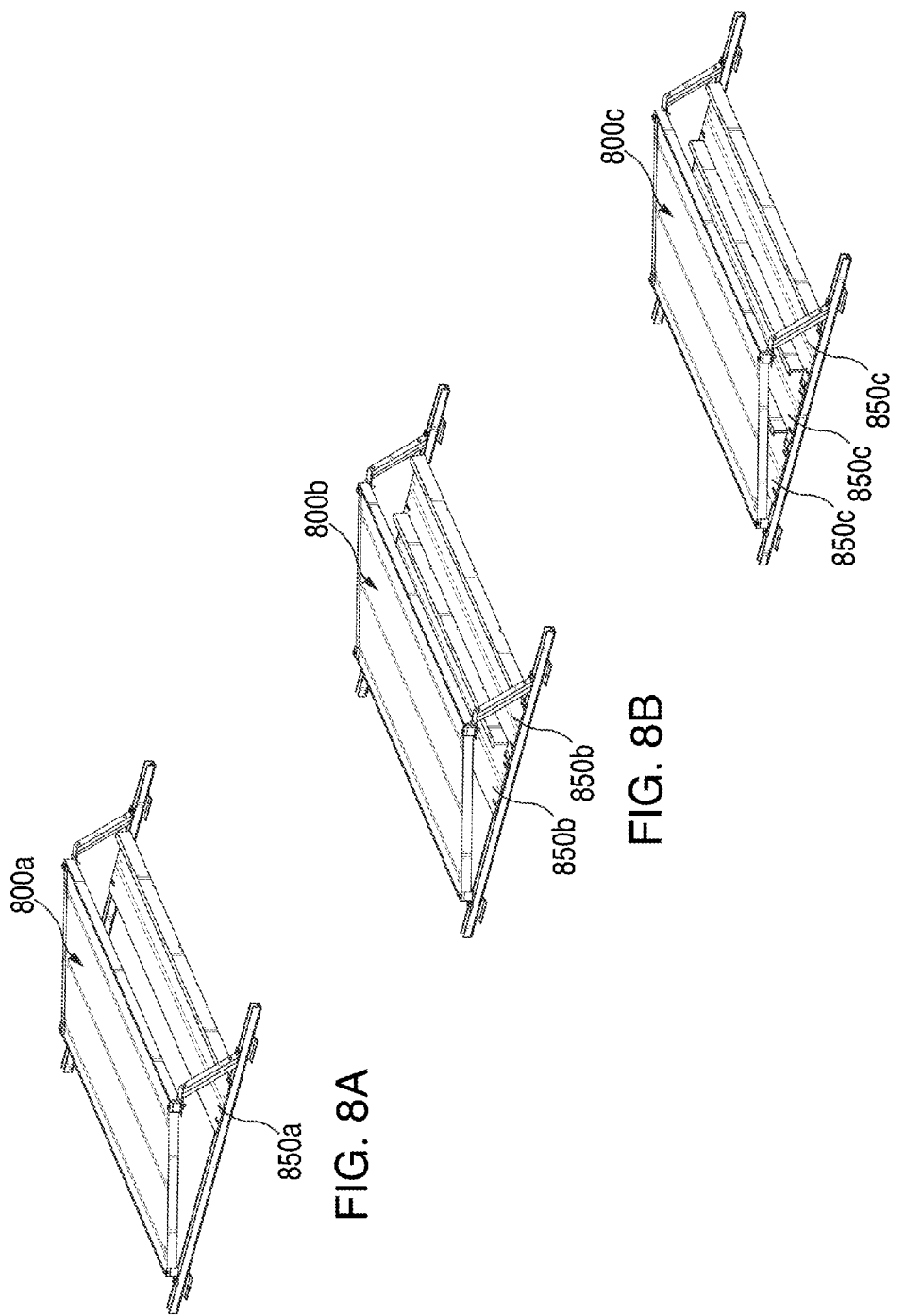
FIGS. 8A, 8B, and 8C depict example embodiments of wind optimized and ballasted solar panel systems with 1-3 wind screens installed to provide additional ballast trays under the module.

FIGS. 8A, 8B, and 8C depict example embodiments of wind optimized and ballasted solar panel systems 800a, 800b, and 800c. Solar panel system 800 can similar, for example, to solar panel system 700 and can include a single horizontal ballast support tray 850a for loading ballast weights. Solar panel systems 800b and 800c of FIGS. 8b and 8c can include two horizontal ballast support trays 850b and three horizontal ballast support trays 850c, respectively. The additional trays in solar panel systems 800b and 800c can be used to load more ballast weights on the system as required by environmental reasons. The ballast support trays of FIGS. 8a, 8b, and 8c can be mounted on solar panel systems 800a, 800b, and 800c with any suitable hardware, including with a bolt, washers and a channel nut as described above with respect to FIG. 7. Any suitable number of ballast support trays can be used to support an appropriate amount of ballast for a solar panel system (e.g., based upon environmental conditions at the installation site).

Figure 9:
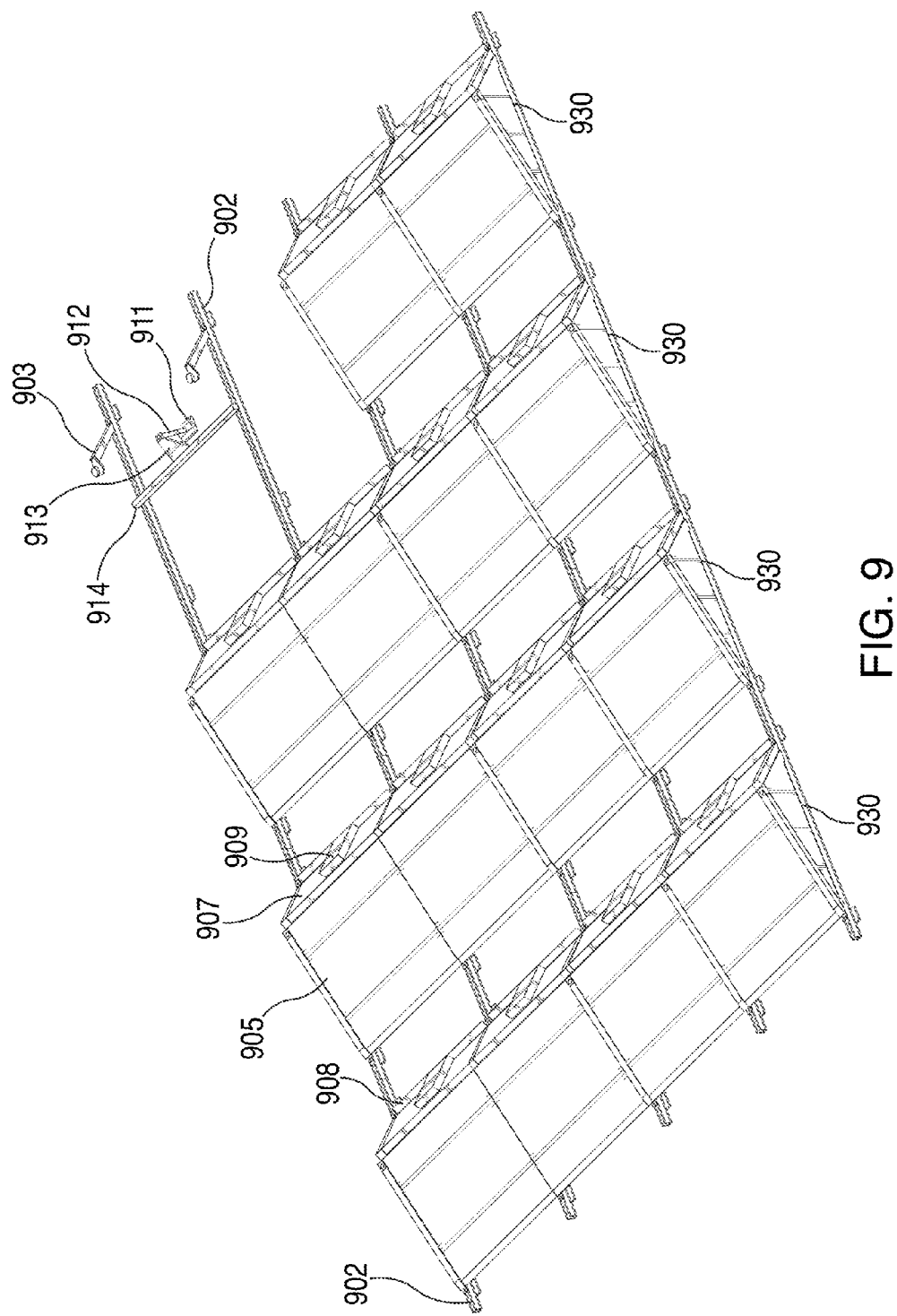
FIG. 9 depicts an isometric view of a partially assembled multi-unit solar panel system.

FIG. 9 depicts an isometric view of a partially assembled multi-unit solar panel system 900. Multi-unit solar panel system 900 can include any suitable number of individual solar panel systems (e.g., solar panel system 100 of FIG. 1) arranged in any suitable number of rows and columns. As depicted, multi-unit solar panel system 900 is designed to have four rows and four columns of individual solar panel systems. Each individual solar panel system can include a solar panel module 905 mounted to rails 902 with support legs 903. Additionally, each individual solar panel system can include ballast weights 909 mounted on a ballast weight tray 908, which can be integrally formed with, or coupled to, windscreen 907.

Side windscreens 930 can be mounted on the outer sides of end-of-row individual solar panel systems. That is, side windscreens 930 may not be mounted on the sides of individual solar panel systems that are adjacent to another individual solar panel system in the same row. According to some embodiments, side windscreens 930 can be mounted on individual solar panel systems with trim pieces (e.g., trim pieces 631, 632, and 633 of FIG. 6) and one or more self-adjusting end clamps 904.

Solar panel modules can be coupled to multi-unit solar panel system 900 using self-adjusting end clamps 904 and/or mid clamps. For example, self-adjusting end clamps 904 may couple solar panel modules 905 to an individual solar panel system (e.g., as described with respect to FIGS. 3 and 4) on the sides of end-of-row individual solar panel systems that are not adjacent to any other individual solar panel system. Contrariwise, where a solar panel module 905 is adjacent to another solar panel module 905 in the same row, mid clamps can be used to secure both of the adjacent solar panel modules 905 to each other and/or to multi-unit solar panel system 900. A mid clamp can be a single clamp that secures two solar panel modules to one or more support legs 903.

In order to improve the structural integrity of multi-unit solar panel system 900, windscreens 907 can be configured to overlap adjacent windscreens 907 in the same row. In some embodiments, a windscreen 907 may be coupled to its own individual solar panel system and/or an adjacent individual solar panel system. For example, an individual solar panel system that is adjacent to two other individual solar panel systems in the same row can have a windscreen 907 that is coupled to support legs 903 of its own individual solar panel system as well as one or both of the adjacent individual solar panel systems. In other embodiments, windscreens 907 can overlap without being physically coupled to support legs 903 of adjacent individual solar panel systems.

Depending on conditions at the installation site, and/or local regulatory requirements, some or all of the individual solar panel systems can include anchor rail 914, standoff bracket 913, standoff attachment 912, and mechanical anchor 911. Anchor rail 914, standoff bracket 913, standoff attachment 912, and mechanical anchor 911 may correspond to, for example, anchor rail 214, standoff bracket 213, standoff attachment 212, and mechanical anchor 211 of FIG. 2. One skilled in the art will appreciate that the type of mechanical anchor used may also depend on conditions and/or requirements at the installation site and, therefore, a different mechanical anchor (e.g., mechanical anchor 250 of FIG. 2) may be appropriate for a given multi-unit solar panel system.

Each row in multi-unit solar panel system 900 may share rails 902 with at least one other row. That is, rails 902 can span the entire length of multi-unit solar panel system 900. In some embodiments, each rail 902 can be formed as a single, contiguous member that can support all of the rows of individual solar panel systems in multi-unit solar panel system 900. In other embodiments, each rail 902 can include a number of individual rails that are coupled (e.g., spliced) together. Although, these embodiments may require extra hardware, they may be preferable as it can be difficult to manufacture and ship very long rails. Regardless of whether each rail is contiguous or multi-sectioned, rails 902 can be mounted on feet 901 (e.g., as described with respect to FIG. 1) after feet 901 are placed on the installation surface.

Figure 10:
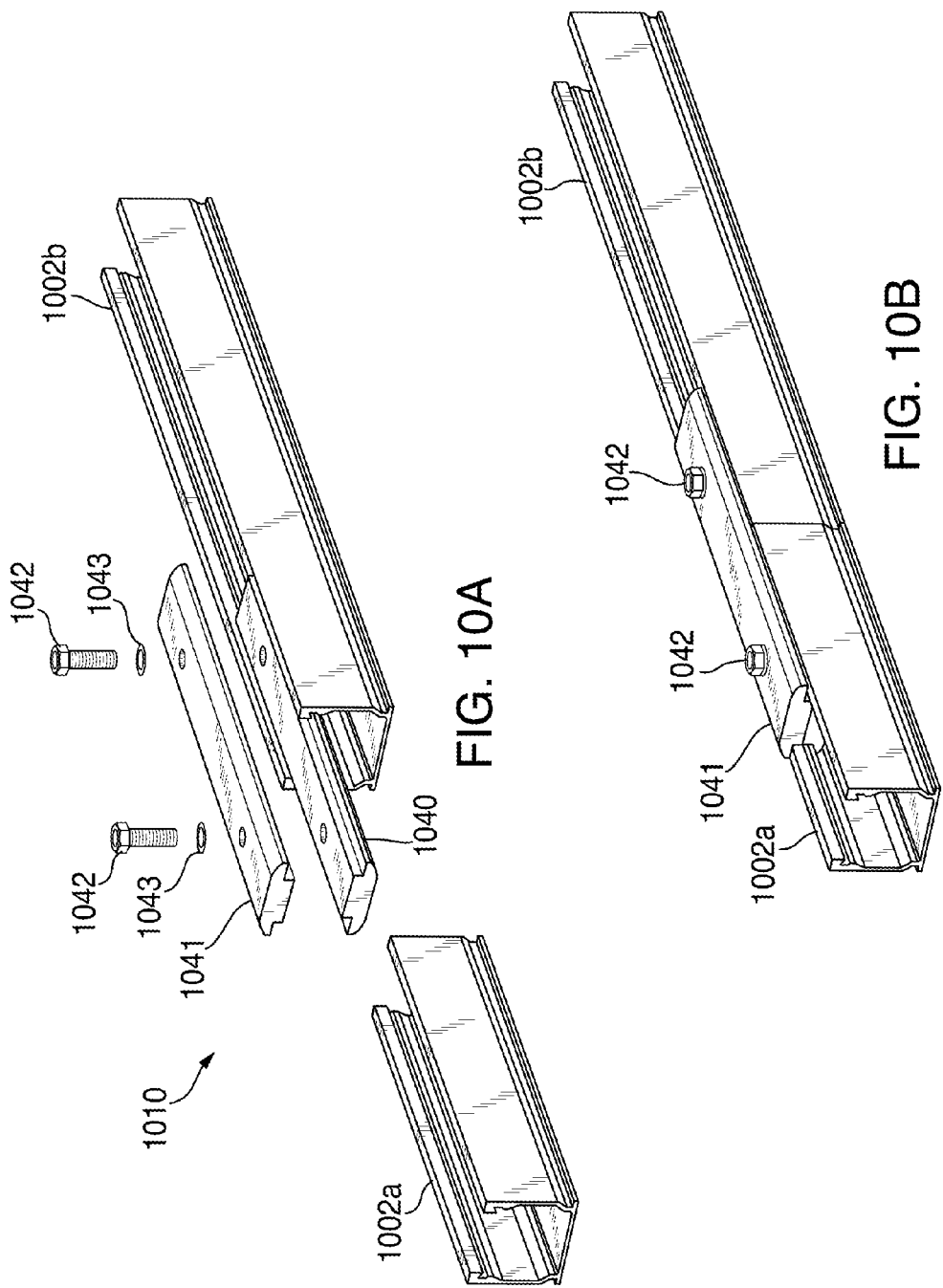
FIGS. 10A and 10B depict views of a rail splice in accordance with some embodiments.

FIG. 10A depicts an exploded view of a rail splice 1010. Rail splice 1010 can include rail 1002a spliced to rail 1002b with rail splice insert 1040, rails splice top 1041, bolts 1042, and split lock washers 1043. In particular, rail splice insert 1040 can be configured to slide or snap into notches formed in rail 1002a and 1002b. Rail 1002a and 1002b may be pushed together (e.g., until they are abutting), and then rail splice top 1041 can be placed above rail splice insert 1040 and clamped into place using bolts 1042 and split lock washers 1043.

FIG. 10B depicts a perspective view of assembled rail splice 910, including rail 1002a spliced to rail 1002b with rail splice insert 1040, rails splice top 1041, and bolts 1042 (split lock washers 1043 are not visible in FIG. 10B). In some embodiments, one or more rail splices 1010 can be used to couple together multiple rails for a solar panel system (e.g., multi-sectioned rails 902 of multi-unit solar panel system 900 of FIG. 9).

Figure 11:
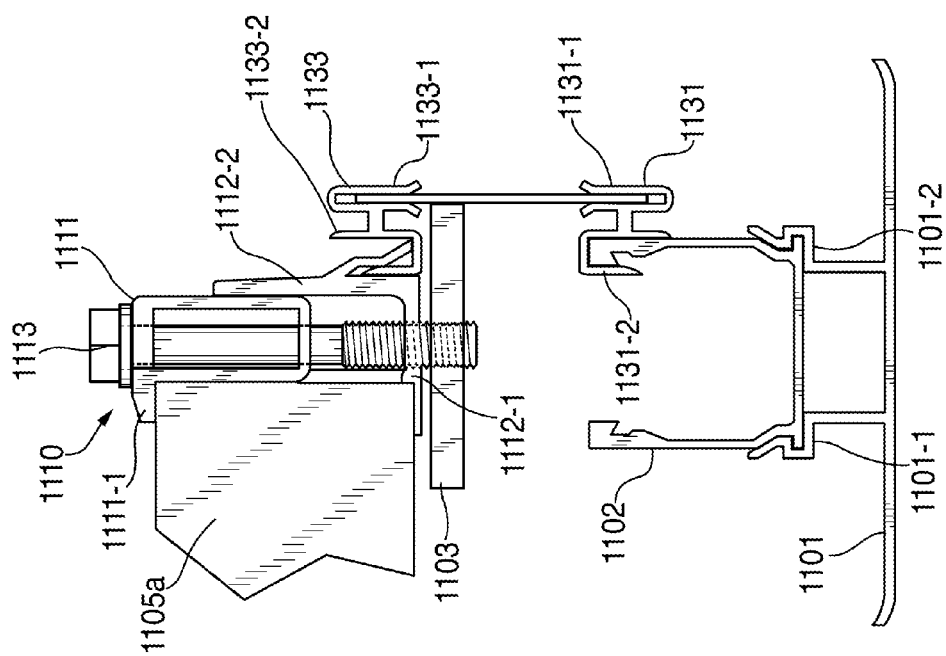
FIG. 11 depicts an attachment assembly with a self-adjusting end clamp.

FIG. 11 depicts an attachment assembly 1100 with a self-adjusting end clamp 1110. Self-adjusting end clamp 1110 may correspond to, for example, self-adjusting end clamp 104 of FIG. 1. Accordingly, self-adjusting end clamp 1110 can be configured to attach a solar panel module to an individual solar panel system (e.g., solar panel system 100 of FIG. 1) or at the ends of rows of solar panel systems that form a multi-unit solar panel system (e.g., multi-unit solar panel system 900 of FIG. 9).

Self-adjusting end clamp 1110 can include a top member 1111 and a bottom member 1112 for attaching a solar panel module 1105 to a support leg 1103 mounted to rail 1102, which can, in turn, be supported by support foot 1001. Self-adjusting end clamp 1110 can grip solar panel module 1105 with top member 1111 and bottom member 1112, which can each include holes for receiving a bolt 1113. As bolt 1113 is tightened, bolt 1113 can move top member 1111 towards bottom member 1112, thereby gripping the solar panel module 1105 between top member 1111 and bottom member 1112.

Top member 1111 of the self-adjusting end clamp 1110 can be a rectangular-prism shaped member that includes top and sides that include the holes for receiving bolt 1113. Top member 1111 can also include opposing vertical sides, a first of which can engage solar panel module 1105 while the second can engage a vertical leg of bottom member 1112. Additionally, top member 1111 can have a lip portion 1111-1 extending perpendicularly from the top side of the first vertical side that can engage a top surface of solar panel module 1105. Lip portion 1111-1 can provide a clamping force on solar panel module 1105 when bolt 1113 is tightened.

Bottom member 1112 can be an L-shaped member with a vertical leg that engages the second vertical side of top member 1111. As bolt 1113 is tightened, the vertical leg of bottom member 1112 can slide against and relative to the second vertical side of top member 1111. Additionally, bottom member 1112 can include a horizontal portion 1112-1 that can partially slide under the solar panel module 1105. Horizontal portion 1112-1 can include a ridge that prevents solar panel module 1105 from making contact with the bolt 1113.

According to some embodiments, bottom member 1112 can also include a clip portion 1112-2 for coupling a trim member to the solar panel system. Clip portion 1112-2 can extend obliquely from the vertical leg of bottom member 1112 in a direction extending away from solar panel module 1105 and towards support leg 1103. Clip portion 1112-2 can clamp down on a U-shaped portion 1133-2 of trim 1133. For example, clip portion 1112-2 can be inserted into a U-shaped portion 1133-2 such that trim 1133 is held in place against support leg 1103. A main section 1133-1 of trim snap 1133 can be configured to retain a top edge of a side windscreen 1130.

A bottom edge of side windscreen 1130 can be retained within a main section 1131-1 of trim 1131. Furthermore, trim 1131 can be snapped onto a flange of rail 902 with a trim snap 1131-2. In some embodiments, trim 1131 and 1133 can be identical, with trim snap 1133-1 of trim 1133 corresponding to U-shaped portion 1133-2 of trim 1133 and main section 1131-1 corresponding to main section 1133-1.

Figure 12C:
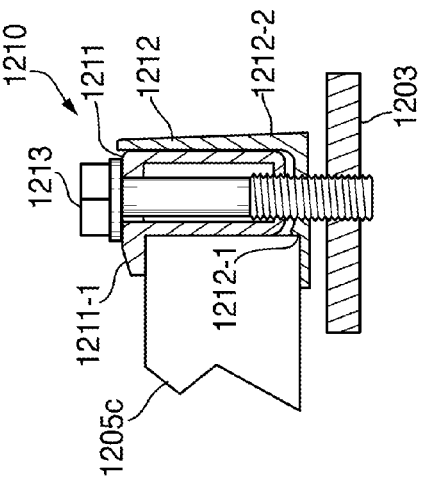
FIGS. 12A, 12B, and 12C show cross-sectional views of a self-adjusting end clamp in accordance with some embodiments.
Figure 12B:
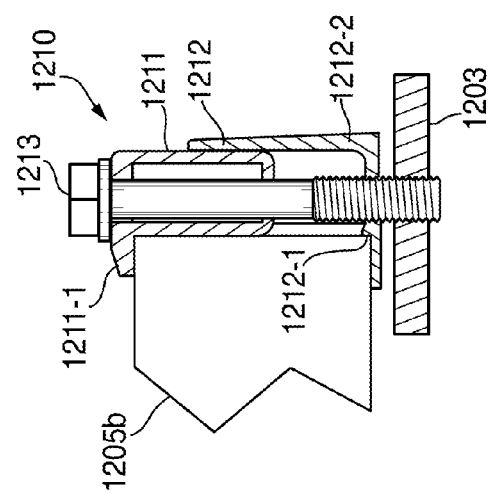
Figure 12A:
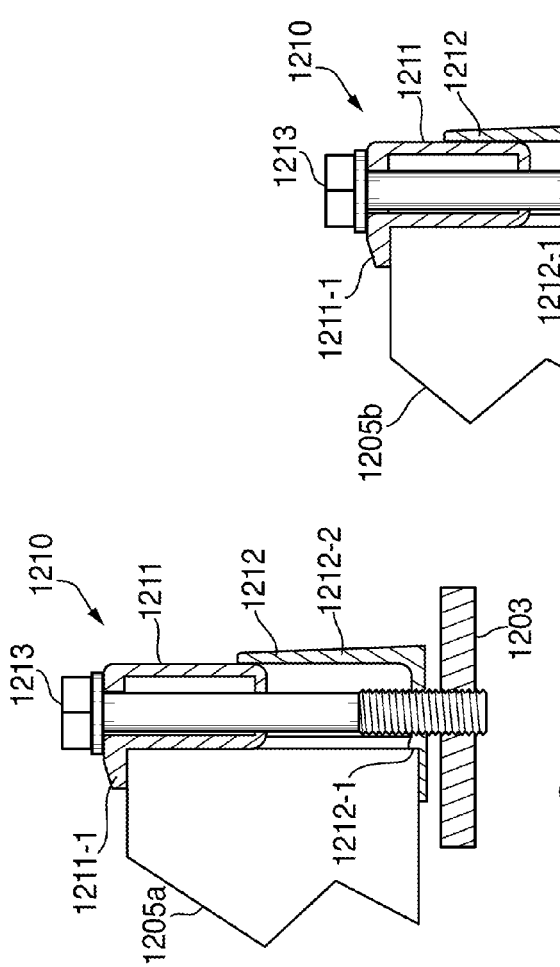

FIG. 12A shows a cross-sectional view of self-adjusting end clamp 1210 in accordance with some embodiments. Self-adjusting end clamp 1210 may be similar to, for example, self-adjusting end clamp 1210, described above with respect to FIG. 11 and can include a top member 1211, a bottom member 1212, and a bolt 1213. Self-adjusting end clamp 1210 may be configured to secure a solar panel module 1205a as part of a solar panel system (e.g., wind optimized and ballasted solar panel system 100 of FIG. 1).

The main body section of top member 1211 can include two vertically-aligned holes for receiving bolt 1213. Bolt 1213 can extend fully through opposing sides of top member 1211 with the head of bolt 1213 abutting one of the opposing sides and the threaded end of bolt 1213 extending through the other opposing side. Top member 1211 can also include a lip 1211-1 that extends perpendicularly from the main body section of top member 1111. As assembled, lip 1211-1 can engage the top surface of solar panel module 1205a while a side surface of solar panel module 1205a abuts a surface of the main body section of top member 1211 that is situated perpendicular to lip 1211-1.

Bottom member 1212 may be coupled to top member 1211 with bolt 1213. In particular, a first surface of bottom member 1212 can include a threaded hole that is configured to be vertically aligned with the two vertically-aligned holes of top member 1211. This first surface of bottom member 1212, as assembled, can be arranged parallel to lip 1211-1 and configured to engage the bottom surface of solar panel module 1205a. Tightening bolt 1213 can bring top member 1211 and bottom member 1212 closer together, resulting in a clamping force on solar panel module 1205a. Further, bolt 1213 may be configured to couple to system anchor 1221. System anchor 1221 may be any system component suitable for supporting self-adjusting end clamp 1210. For example, system anchor 1221 may be a rail insert, such as a channel nut (e.g., channel nut 221 of FIG. 3), or a support leg component (e.g., top section 203a of support leg 203 of FIG. 4).

Bottom member 1212 may also include an integrally formed second surface 1212-2, perpendicular to the first surface and in substantial alignment with bolt 1213. This second surface 1212-2 of bottom member 1212 can abut the main body section of top member 1211 on a side opposing the surface of the main body section of top member 1211 that abuts solar panel module 1205a such that top member 1211 is "sandwiched" between solar panel module 1205a and second surface 1212-2 of bottom member 1212. As shown, the first surface of bottom member 1212 may include a ridge 1212-1 configured to prevent solar panel module 1205a from sliding towards bolt 1213.

FIGS. 12B and 12C show further cross-sectional views of self-adjusting end clamp 1210 in accordance with some embodiments. In particular FIGS. 12B and 12C depict self-adjusting end clamp 1210 engaging solar panels of various thicknesses. For example, the same self-adjusting end clamp 1210 can be used to effectively clamp solar panel module 1205a, 1205b, and 1205c, which have varying thicknesses. Because self-adjusting clamp 1210 can be used for clamping solar panels of various thicknesses, the clamp may be used universally for various wind-optimized and ballasted solar panel system embodiments.

Figure 13:
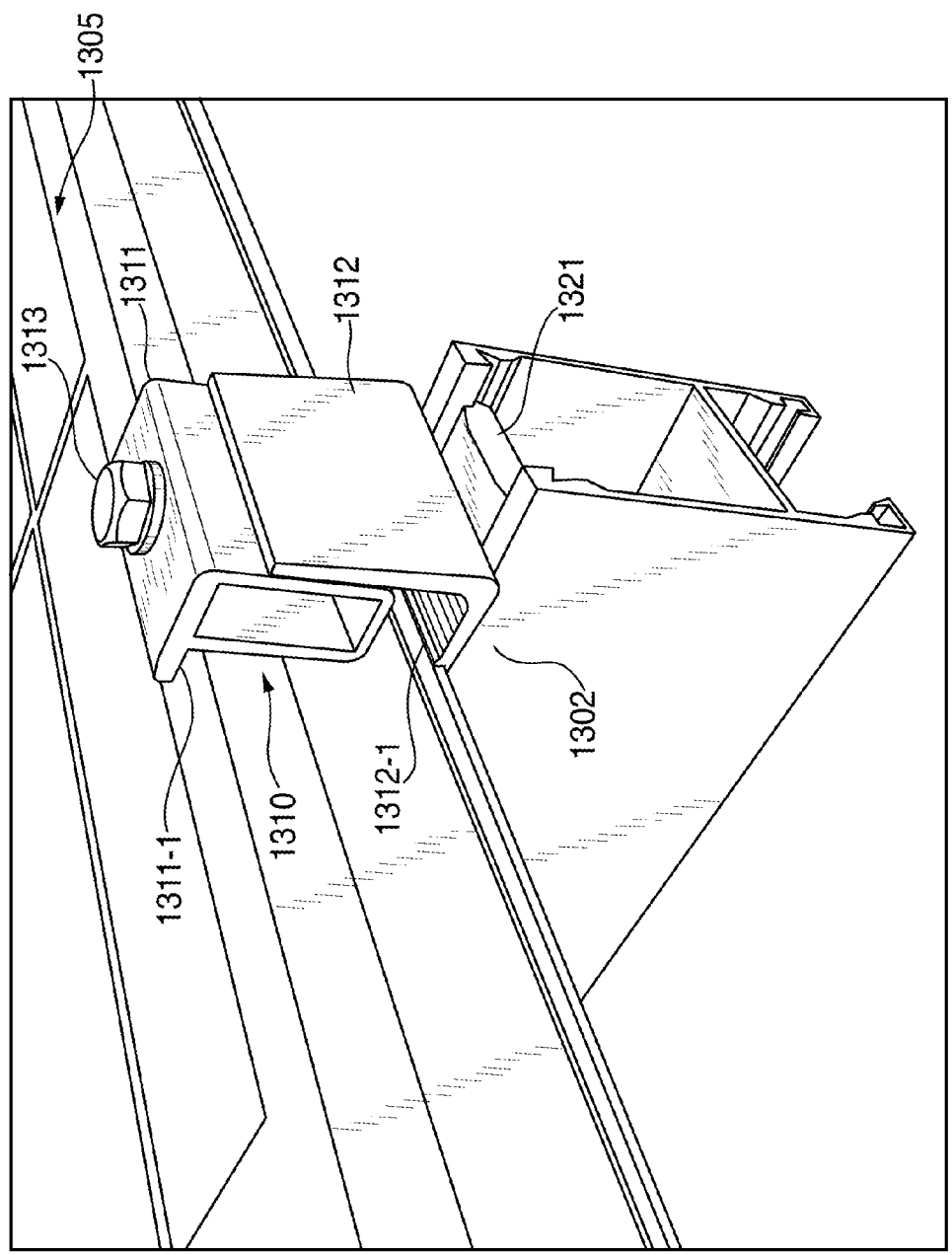
FIG. 13 is a perspective view of a section of a solar panel system 1300 in accordance with some embodiments.

FIG. 13 is a perspective view of a section of a solar panel system 1300 in accordance with some embodiments. Solar panel system 1300 can include solar panel 1305, self-adjusting end clamp 1310, and rail 1302. Self-adjusting end clamp 1310 may be similar to self-adjusting end clamp 1310 of FIGS. 12A-C and can include top member 1311, bottom member 1312, and bolt 1313.

Rail 1302 can include rail insert 1321, which may be configured to slide or snap into rail 1302. Rail insert 1321 can include a threaded hole that is configured to receive the threaded end of bolt 1313 after it passes through top member 1311 and bottom member 1312 of self-adjusting end clamp 1310. Rail insert 1321 may correspond to, for example, channel nut 221 of FIG. 3.

As assembled, lip 1311-1 prevents solar panel 1305 from being lifted out of solar panel system 1300, and ridge 1312-1 prevents solar panel 1305 from sliding towards bolt 1313. In this configuration, tightening bolt 1313 securely fastens self-adjusting end clamp 1310 to rail 1302 in addition to providing a clamping force to solar panel 1305. According to some embodiments, self-adjusting end clamp 1310 may be bolted to component of a support leg (e.g., top section 203a of support leg 203 of FIG. 4).

While there have been described wind tunnel optimized solar panel systems, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A self-adjusting end clamp, comprising:
a top portion with a lip;
a bottom portion with a lip, a bolt receiving portion, and a ridge, wherein the ridge protrudes toward the lip of the top portion and laterally separates parallel surfaces of the lip of the bottom portion and of the bolt receiving portion, and wherein the distance between the lip of the top portion and a surface of the ridge facing the lip of the top portion is less than the distance between the lip of the top portion and the bolt receiving portion; and
a bolt extending between an aperture of the top portion and an aperture of the bolt receiving portion, wherein when the bolt is tightened the lips of the top portion and the bottom portion move towards each other.

2. A self-adjusting end clamp, comprising:
a top member, comprising:
   a main body portion comprising a first wall, a second wall, a third wall, and a fourth wall, wherein the first wall opposes the third wall, and wherein the second wall opposes the fourth wall; and
   a lip extending from the main body portion, wherein:
      the lip is coplanar with the first wall and perpendicular to the second wall;
      the first and third walls each comprise a hole configured to receive a bolt; and
      the holes are vertically aligned; and
a bottom member comprising a first portion and a second portion, wherein:
   the first and second portions are perpendicular and integrally formed;
   the first portion is arranged parallel to the first and third walls of the main body portion of the top member and comprises:
      a hole for receiving the bolt; and
      a ridge extending away from and across a width of the first portion; and
   the second portion abuts the fourth wall of the main body portion of the top member.

3. The self-adjusting end clamp of claim 1, wherein:
the top portion comprises a main body having a substantially rectangular cross-section; and
the lip of the top portion extends from the main body.

4. The self-adjusting end clamp of claim 3, wherein:
the lip of the top portion is arranged coplanar with a first side of the main body and perpendicular with a second side of the main body.

5. The self-adjusting end clamp of claim 4, wherein the ridge is vertically aligned with the second side of the main body.

6. The self-adjusting end clamp of claim 3, wherein the bolt extends fully through the main body.

7. The self-adjusting end clamp of claim 1, the bottom portion being L-shaped.

8. The self-adjusting end clamp of claim 1, wherein the ridge, the lip of the bottom portion, and the aperture are arranged on a first arm of the L-shaped bottom portion.

9. The self-adjusting end clamp of claim 8, wherein a second arm of the L-shaped bottom portion engages the top portion on a side of the top portion opposing the lip.

10. The self-adjusting end clamp of claim 8, wherein the parallel surfaces of the lip and the bolt receiving portion abut the ridge.

11. The self-adjusting end clamp of claim 1, comprising:
a clip portion extending obliquely from the bottom portion from a surface opposing the lip.

12. The self-adjusting end clamp of claim 1, the aperture of the bottom portion being a threaded aperture configured to threadably receive the bolt.

13. The self-adjusting end clamp of claim 2, the main body portion having a substantially rectangular cross-sectional shape, wherein the second wall and the fourth wall extend perpendicularly from the first wall, and the third wall extends perpendicularly between the second wall and the fourth wall.

14. The self-adjusting end clamp of claim 2, wherein the surfaces of the first portion are substantially parallel on either side of the ridge.

15. The self-adjusting end clamp of claim 2, wherein the second wall of the main body is arranged proximally with respect to the lip and the fourth wall of the main body is arranged distally with respect to the lip.

16. The self-adjusting end clamp of claim 2, comprising:
a clip portion extending obliquely from a second side of the second portion of the bottom member opposing a first side that engages the fourth wall of the main body.

17. The self-adjusting end clamp of claim 2, wherein the ridge is arranged between the lip and the threaded hole of the bottom portion.

18. The self-adjusting end clamp of claim 2, wherein the hole of the bottom member is a threaded hole for threadably receiving the bolt.

* * * * *